United States Patent [19]

Swartz et al.

[11] Patent Number: 4,556,571

[45] Date of Patent: Dec. 3, 1985

[54] USE OF SOY PRODUCTS HAVING A REDUCED BEANY FLAVOR IN MEAT AND OTHER FOOD PRODUCTS

[75] Inventors: William E. Swartz, Upper St. Clair; Charles W. Everson, McMurray; Fredric G. Bender, Houston, all of Pa.

[73] Assignee: Stauffer Chemical Company, Westport, Conn.

[21] Appl. No.: 739,491

[22] Filed: May 30, 1985

Related U.S. Application Data

[63] Continuation of Ser. No. 541,943, Oct. 14, 1983, abandoned.

[51] Int. Cl.⁴ .......................... A23J 3/00; A23L 1/272
[52] U.S. Cl. ..................................... 426/265; 426/533; 426/634; 426/646; 426/652; 426/656
[58] Field of Search ............... 426/533, 634, 646, 650, 426/652, 656

[56] References Cited

U.S. PATENT DOCUMENTS

| | | | |
|---|---|---|---|
| 2,627,462 | 2/1953 | Pettibone | 426/634 |
| 3,485,636 | 12/1969 | Hoffman | 426/634 |
| 3,875,313 | 1/1975 | Brotsky | 426/264 X |
| 4,066,793 | 1/1978 | Eguchi | 426/650 X |
| 4,165,391 | 8/1979 | Rolison | 426/650 X |
| 4,285,976 | 8/1981 | Akin et al. | 426/650 X |

*Primary Examiner*—Robert Yoncoskie
*Attorney, Agent, or Firm*—Paul J. Juettner

[57] ABSTRACT

The beany flavor of soy products can be reduced by hydrating the soy product with a solution containing a water soluble primary yeast extract prior to incorporating the soy product into a food product, preferably a comminuted meat product.

22 Claims, No Drawings

USE OF SOY PRODUCTS HAVING A REDUCED BEANY FLAVOR IN MEAT AND OTHER FOOD PRODUCTS

This is a continuation of application Ser. No. 541,943 filed Oct. 14, 1983 now abandoned.

The present invention relates to the use of soy products in food products and in particular to a method for reducing the unpleasant characteristic beany flavor of the soy in comminuted meat products.

The use of inexpensive soy protein to extend expensive meat protein has not become widespread in the United States principally because the soy protein, whether in the form of soy flour or grits at about 50% protein, soy concentrate at 65% protein, or isolate at 90% protein, imparts an unpleasant, characteristic beany flavor to the meat-soy product. Much effort has been expended to reduce or eliminate this flavor effect which seems to be associated with the carbohydrate portion of the soy bean. The flavor effect is less evident with soy isolates than with soy concentrates than with soy flour or grits. However, even with the improved forms of soy presently available, the off-flavor is sufficiently evident to limit the demand for meat-soy products.

The prior art has suggested various spices and mixtures of spices with and without flavor modifiers or enhancers to overcome the beany flavor problem but the meat-soy products still are sold in relatively small quantities in retail markets and then only at a considerably reduced price. The only success meat-soy products have enjoyed is in the institutional market where "captive" customers have little choice, e.g. schools, nursing homes, penal institutions and the like.

We have discovered that the addition of a small quantity of a primary autolyzed yeast extract in a specified manner can effectively mask the soy flavor to the point where the food-soy product is much more acceptable organoleptically than is the same food-soy product without the addition of the primary autolyzed yeast extract or even the addition of the same ingredients added to the food product separately.

SUMMARY OF THE INVENTION

It has been discovered that food products and particularly comminuted meat products, which term includes ground meat products, can be extended with a soy protein-containing product wherein the final product is characterized by a reduced beany flavor. The soy protein product of the present invention is prepared by hydrating a porous soy protein product containing at least 40% protein with a solution of primary yeast extract. By the use of the prehydration step using a water soluble primary yeast extract, it has been found that improved reduction in beany flavor can be obtained over and above merely admixing the same ingredients with the food product itself.

DETAILED DESCRIPTION OF THE PRESENT INVENTION

The soy protein product used in the present invention can be prepared by any known procedure. The soy protein-containing products which are usable in the present invention contain at least 40% protein. These include soy flour or soy grit at approximately 50% protein, soy concentrates at approximately 65% protein and soy isolate at approximately 90% protein. The soy protein usable in the present invention is porous and hydratable to the extent that it can take up to about three times its weight in moisture. Preferably, the soy protein product contains about 50% protein and more preferably at least about 65% protein.

The autolyzed yeast extract, also known as yeast autolysate, and AYE, used in the present invention is the yeast extract produced from standard yeast cells by an internal or self hydrolysis caused by the action of proteolytic enzymes occurring naturally within the yeast. The extract is a water soluble material prepared by removing the cell walls from autolyzed yeast. The autolyzed yeast extract can be made from many strains such as *Saccharomyces uvarum* and *Saccharomyces carlsbergensis* though is preferred to utilize the primary yeast *Saccharomyces cerevisiae* as the source of the yeast autolysate. The selection of the yeast is dictated by the flavor characteristics provided by the yeast autolysate. One skilled in the art can select the proper yeast based on organoleptic considerations. The autolyzed yeast extract is available as a liquid, concentrate, paste (80% total solids) and powder. The autolyzed yeast extract products are also available in various total solids content, salt content and protein content. Selection of the appropriate material is well within the skill of the art.

The soy protein product as heretofore defined is a dehydrated product characterized by a porous nature. In accomplishing the process of the present invention, primary yeast extract is dissolved in water to prepare a solution containing from about 1% to about 25% autolyzed yeast extract. The soy protein is hydrated in solution until the soy absorbs at least one times its weight in water. The soy protein in general never goes into solution and will hydrate to no more than about three times its weight in water. The hydrated soy particles are softer than the dehydrated particles and have a texture slightly harder than meat but are sufficiently soft and moist to allow grinding.

In a preferred form of the invention, a solution is prepared that sufficiently contains all the liquid and yeast extract required for hydrating a batch of soy protein product. The soy protein product is hydrated in the solution until all the solution is absorbed. Since the soy protein product will absorb only up to about three times its weight in solution, it is also within the scope of the present invention to utilize a large quantity of solution for hydrating a small quantity of soy followed by removing the hydrated soy and using the solution to further hydrate additional soy product. This can also be done on a continuous basis if desired. The latter procedures are less preferred inasmuch as the soys tend to absorb water at an inconsistent rate. In preparing comminuted meat products it is necessary that the water content of the final product be controlled to maintain the water content within any governmental control range The soy protein-containing product is preferably hydrated with the yeast extract containing solution just prior to use to avoid an expensive drying step. When using the so hydrated product in meat, the soy after hydration is ground with the meat to prepare a more uniform product.

It is also within the scope of the invention to hydrate the soy and then dry the resultant product. The consumer could then rehydrate the product prior to use or simply add the unhydrated product to the food. In either instance, the yeast remains intimately associated with the soy product. The addition of the yeast can also be accomplished during the manufacturing process of the soy product before the soy product has been dried.

Because the soy is preferably hydrated with all of the solution of yeast or because of the limited hydratability of soy product, the percent yeast utilized in the solution is governed by the amount of yeast and/or the amount of soy used in the final product. The amount of yeast in solution can be calculated from the amount of soy product used and the amount of liquid taken up during hydration.

While there is no general amount of soy protein which can be incorporated into the preferred meat products as per the present invention, practical limits as well as governmental limits limit the amount of soy protein that can be used. Preferably the soy protein is used in an amount ranging from about 3.5 to about 10% and preferably from about 5.0 to about 7.5%.

There is no specific limitation other than practical reasons such as cost and the strength of the yeast extract flavor to the amount of yeast extract used in the preferred comminuted meat product. It is necessary that the yeast extract be used in an amount sufficient to overcome the beany taste of the soy protein product whether in meat or other food product. The yeast extract is preferably present in an amount ranging from about 5% to about 50% based on the combined dry weight of the extract and the soy product. It is preferred that the amount of yeast used in foods in general range from about 0.1% to about 2.0% and in the preferred comminuted meat products from about 0.25% to about 1.5% by weight based on the total weight of the product.

The hydrated soy protein composition as described hereinbefore can be effectively added to comminuted meats to extend the same without providing a meat product characterized by undesirable organoleptic characteristics such as a beany flavor.

By comminuted meat is meant herein, comminuted meat products prepared from one or more kinds of skeletal muscle meat and poultry meat including cooked sausage, meat patties and non-specific loaves. Cooked sausage are those comminuted meat products defined by the United States Department of Agriculture in 9 C.F.R. 319.180. Cooked sausage can be illustrated by frankfurters, weiners, bologna, garlic bologna, knockwurst and similar products. In addition to sausage products, the comminuted meat further includes beef patties as defined in 9 C.F.R. 319.15.

The products of the present invention can also be used in extending non-specific loaves as defined in 9 C.F.R. 319.280. These include luncheon loaves which are generally chopped or ground meat of beef, pork, veal or lamb molded into a specific shape, such as a square shape, and which can contain cereals, soy and non-fat dry milk as well as other non-cereal extenders and if desired flavorings such as chopped nuts, olives, cooked macaroni, pistachio nuts, dry cheese and the like. These loaves can be dry cooked in a smokehouse or canned and cooked in water. The process of the present invention finds particular use in extending meat patties including hamburgers, veal patties and the like.

The compositions of the present invention can also be used to extend other meat products such as meat balls, chunked and formed meat, chicken hot dogs and meat containing fillers such as for raviolis.

The products of the present invention can be added to the meat products in general by hydrating the soy protein and grinding the so hydrated soy protein with the meat in order to obtain a well admixed blend. The method for incorporating soy protein or other extenders in meat is well known in the industry. The final products are prepared in the usual manner.

The comminuted meat products of the invention can include any of the flavoring agents, flavor enhancers, i.e. MSG, stabilizers and preservatives, antioxidants such as ascorbic or erythorbic acid and salts, dyes, colors and water absorbing agents as are presently in use in the industry. These can be added either to the soy during hydration or directly to the meat as desired.

Included in the term antioxidants is the product described in U.S. Pat. No. 3,875,313 which is sodium tripolyphosphate hydrated with a solution containing citrus juice solids such as lemon juice solids, lime juice solids and mixtures thereof. The use of autolyzed yeast extract in combination with sodium tripolyphosphate hydrated with citrus juice solids has been found to be particularly effective in improving the organoleptic acceptability of various comminuted meat products, particularly those prepared from lower grade meats such as shank meat as is disclosed and claimed in U.S. Pat. No. 4,500,559 entitled IMPROVING PALATABILITY OF MEAT PRODUCTS OF F. G. Bender, C. W. Everson, W. E. Swartz.

Since the sodium tripolyphosphate hydrated with lemon juice solids acts directly on the meat, it is preferred that this material be added directly to the meat.

The sodium tripolyphosphate hydrated with water containing lemon juice solids can be prepared in accordance with the teachings of U.S. Pat. No. 3,875,313, the disclosure of which is incorporated by reference. Anhydrous sodium tripolyphosphate is hydrated with the equivalent of six moles of an aqueous solution containing 6% to 37% by weight lemon juice solids per mole of sodium tripolyphosphate. However, any dry hydrate composition comprising sodium tripolyphosphate and lemon juice solids in a weight ratio of from about 7:1 to about 70:1 may be used. The hydration is conducted with such a proportion of sodium tripolyphosphate to lemon juice that all the moisture is used in preparing a dry, free-flowing product. The sodium tripolyphosphate can also be hydrated with a solution containing citrus fruit solids such as lime solids or combinations of lemon and lime solids. Sodium tripolyphosphate hydrated with water containing lemon juice solids is available from Stauffer Chemical Company under the trademark LEM-O-FOS ®.

The sodium tripolyphosphate hydrated with citrus juice solids is preferably used in a ratio to the yeast extract in an amount ranging from about 0.3 to about 0.7:1 and preferably about 0.5:1, the ratio being based on the weight of the final product (before cooking).

The composition of the present invention can be used in any food which is compatible with the soy protein such as sauces, soups, gravies, fillings, breadings, batters and the like. While the yeast extract can be selected to provide a wide range of flavors, the yeast extract is generally said to have a "brothy" taste reminiscent of meat broth. The area of use must be compatible with the flavor of the product of the invention. The product of the invention can be used in foods in an amount effective to perform the same function the soy alone now performs. In general, the product of the invention can be added to the food in an amount ranging from about 1% to about 25%. The amount of yeast extract can range from about 0.1% to about 2.0%. Amounts will vary depending on the food product, which amount can be easily determined by a skilled artisan.

The present invention will be more fully illustrated in the Examples which follow. In these Examples, the sodium tripolyphosphate hydrated with lemon juice solids is LEM-O-FOS ® brand from Stauffer Chemical Company.

EXAMPLES 1-5

Ground beef patties were prepared in accordance with the invention using the formulations shown in TABLE I. The soy protein, if used, was hydrated in an aqueous solution containing primary yeast extract and a sodium tripolyphosphate product hydrated with a solution of lemon juice. Controls were prepared using soy hydrated with water or water and the lemon juice-sodium tripolyphosphate product. The meat and the hydrated soy were blended in a Hobart planetary mixer for 4 minutes using a spade-shaped blade. The meat was formed into patties with an automatic patty maker and the patties were frozen. A control containing sodium tripolyphosphate hydrated with lemon juice solids was prepared by admixing the meat with the phosphate in the Hobart.

Four of each patty were cooked on a grill at 325° F. (163° C.) for 4 minutes, turned over and cooked for an additional 2 minutes. The patties were drained for 2 minutes using 3 paper towels on the bottom and 2 on top. The following results were obtained.

TABLE I

| Example No. | Ground Beef | Lemon Juice-STP | Soy Protein[1] | Yeast Extract[2] | Water | % Yield |
|---|---|---|---|---|---|---|
| 1 | 25 Lbs. (11.35 Kg) (Control) | — | — | — | — | 67.98 65.45 69.63 69.46 |
| | | | | | Average % | 68.13 |
| 2 | 24.25 Lbs. (11.01 Kg) (Control) | 0.125 Lb. (56.75 g) | — | — | 0.625 Lb. (.284 Kg) | 78.87 76.77 77.76 76.03 |
| | | | | | Average % | 77.36 |
| 3 | 18.25 Lbs. (8.29 Kg) (Control) | — | 2.25 Lbs. (1.02 Kg) | — | 4.5 Lbs. (2.04 Kg) | 81.15 79.59 79.99 80.92 |
| | | | | | Average % | 80.92 |
| 4 | 17.5 Lbs. (7.97 Kg) (Control) | 0.125 Lb. (56.75 g) | 2.25 Lbs. (1.02 Kg) | — | 5.125 Lbs. (2.33 Kg) | 81.33 81.61 82.29 80.99 |
| | | | | | Average % | 81.55 |
| 5 | 16.75 Lbs. (7.60 Kg) (Invention) | 0.125 Lb. (56.75 g) | 2.25 Lbs. (1.02 Kg) | 0.25 Lb. (113.5 g) | 5.625 Lbs. (2.55 Kg) | 81.25 80.90 80.56 82.79 |
| | | | | | Average % | 81.38 |

[1]Response brand 4401 from Central Soya containing 70% protein.
[2]MIT yeast autolysate powder (*Saccharomyces cerevisiae*) from Stauffer Chemical Company The ground beef without additives provided an average yield of about 68%. The addition of sodium tripolyphosphate hydrated with lemon juice provided a yield of 77%. Soy protein alone provided a yield of 80% but an unacceptable soy flavor was detected. The hydration of the soy with a solution containing the sodium tripolyphosphate hydrated with lemon juice provided a slight increase in yield but did not overcome the undesirable soy flavor. A high yield of 81% and good flavor was attained by hydrating the soy with an autolyzed yeast extract and sodium tripolyphosphate hydrated with lemon juice.

Taste panels conducted on an informal basis showed a consistent preference for the flavor and juiciness of the patties prepared with autolyzed yeast extract and sodium tripolyphosphate hydrated with lemon juice solids.

EXAMPLE 6

This example was run to determine if two different procedures for adding the sodium tripolyphosphate hydrated with lemon juice to the patties provided different yields and degrees of toughness in cooking patties from frozen storage.

Patties were prepared from the following ingredients:

| Ingredient | Weight | Percent |
|---|---|---|
| Ground Beef | 670 g | 67.0 |
| Soy | 90 g | 9.0 |
| Water (50° F.–10° C.) | 225 g | 22.5 |
| Yeast Autolysate Extract | 10 g | 1.0 |
| STP - Lemon Juice | 5 g | 0.5 |
| Totals | 1000 g | 100.0 |

The meat patties were prepared utilizing the following procedure (Treatment A):

1. Dissolve the autolyzed yeast extract in 175 grams of water,
2. add the solution from step 1 to dry soy and hydrate for 20 minutes, stirring after 10 minutes,
3. to 670 grams of meat ground through a ⅛ inch (0.31 cm) plate add 50 grams of water in which was previously dissolved the STP-lemon juice and mix in Kitchen Aid mixer for 2 minutes at speed 1,
4. add hydrated soy and mix for 2 additional minutes,
5. prepare 3 oz (84 gram) patties and freeze, 6. the next day temper the patties for 10 minutes at room temperature and then cook the patties on a grill at 325° F. (163° C.) for 4 minutes, flipping the patties over and cooking for an additional 2 minutes. The cooked patties are drained for 4 minutes between paper towels.

7. Calculate yields and determine taste.

A like group of patties was prepared utilizing the same procedure with the exception that the sodium tripolyphosphate hydrated with lemon juice was dissolved in water in step 1 and not in the 50 grams of water in step 3. The procedure will be referred to as Treatment B.

Blind tasting by 4 panelists all indicated Treatment A being less tough than Treatment B.

The percent yield was determined based on the cooked weight of 10 patties. The following results were obtained.

TABLE II

| | Yield (%) | |
|---|---|---|
| | Treatment A | Treatment B |
| 1 | 84.34 | 79.69 |
| 2 | 84.61 | 77.50 |
| 3 | 87.37 | 81.87 |
| 4 | 82.65 | 79.95 |
| 5 | 84.37 | 76.02 |
| 6 | 83.92 | 77.88 |
| 7 | 81.93 | 78.63 |
| 8 | 85.95 | 75.37 |
| 9 | 85.74 | 76.37 |
| 10 | 87.83 | 78.51 |
| Average | 84.87% | 78.18 |

EXAMPLE 8

Sixty pounds (27.24 Kg) of trimmed chuck and 30 pounds (13.62 Kg) of beef platts were ground together through 1 inch (2.5 cm), 3/16 inch (0.47 cm) and ⅛ inch (0.31 cm) plates. Soy, if used, is hydrated 1 hour before use. If yeast was used, the yeast is dissolved in water which was used to hydrate the soy. The meat was placed in a large bowl of a Hobart mixer and the sodium tripolyphosphate hydrated with lemon juice (if used) was admixed therewith. The soy was then admixed with the meat for a total of 2 minutes of mixing. The composition was then frozen into patties.

TABLE IV

| Meat | STP/Lemon Juice | Soy Protein-3 | Soy Protein-4 | Yeast Autolysate |
|---|---|---|---|---|
| 16 lbs. (A) (7.26 Kg) | 0 | 0 | 0 | 0 |
| 15 lbs. 15 oz. (B) (7.24 Kg) | 37 g | 0 | 0 | 0 |
| 11 lbs. 5.7 oz. (C) (5.16 Kg) | 0 | 559 g in 1257 ml water | 73 g in 218 ml water | 0 |
| 11 lbs. 4 oz. (D) (5.11 Kg) | 37 g | 559 g in 1257 ml water | 73 g in 218 ml water | 0 |
| 10 lbs. 12.7 oz. (E) (4.9 Kg) | 37 g | 559 g in 1257 ml water | 73 g in 218 ml water | 73 g in 146 ml water |

Soy Protein 3 = GSVPT (47% protein) from Griffith Laboratories.
Soy Protein 4 = Griffith Promax 70L (70% protein) from Griffith Laboratories.
Yeast autolysate = M1T see Example 1

The patties were frozen and stored for one month. After thawing at room temperature, the patties were fried on an electric grill at 325° F. (163° C.) 3 minutes on each side.

A triangle test was conducted between samples (A) (all meat) and (B) (STP-Lemon Juice). Six of the thirteen panelists could correctly identify the odd sample because the differences between samples was too small.

Twenty-five panelists ranked samples (B) - (E). The rank totals are as follows (lowest score indicates better ranking):

| Sample | Rank Totals |
|---|---|
| (B) STP - Lemon Juice | 50 |
| (C) Soy | 69 |
| (D) STP - Lemon Juice/Soy | 68 |
| (E) STP - Lemon Juice/Soy/AYE | 60 |

An analysis of the results showed no significant preference. Panelists often have difficulties differentiating meat samples, particularly when 4 or more are tested at once. Some panelists selected sample (B) because they thought that it was the only all beef sample. Some panelists selected sample (E) containing the STP - lemon juice/yeast extract because they thought it had the best flavor.

EXAMPLE 9

The flavor effects of various yeast autolysate extracts were tested in pork patties containing soy protein. The yeast, if any, is dissolved in strained ice water and the soy is then hydrated for ½ hour minimum before use. Ground pork, which has been ground through a ¼" (162 cm) plate is placed in a large Hobart bowl. Sodium tripolyphosphate hydrated with lemon juice is added dry to the meat and mixed for 30 seconds. The hydrated soy is then added and the meat mixed for an additional 1 minute using speed No. 1. The meat was reground in a table top grinder through a ⅛ inch (0.31 cm) plate. Two patties of 2½ oz. each were made and placed in storage at 38° F. (3.3° C.). The following patties were prepared:

TABLE V

| Ground Pork | STP/Lemon Juice | Soy Protein (3:1 Hydration) | Yeast | Water |
|---|---|---|---|---|
| 4 lbs. 15.6 oz. (2258.65 g) | 11.35 g | 0 | 0 | 0 |
| 3 lbs. 7.6 oz. (1577.65 g) | 11.35 g | 170.25 g | 0 | 510.75 ml |
| 3 lbs. 5.2 oz. (1509.55 g) | 11.35 g | 170.25 g | 22.7 g AYE-1 | 556.15 ml |
| 4 lbs. 15.6 oz. (2258.65 g) | 11.35 g | 0 | 22.7 g AYE-2 | 0 |
| 3 lbs. 7.6 oz. (1577.65 g) | 11.35 g | 170.25 g | 22.7 g AYE-3 | 510.75 ml |
| 3 lbs. 5.2 oz. (1509.55 g) | 11.35 g | 170.25 g | 22.7 g AYE-4 | 556.15 ml |

Soy protein = Response 4310 from Central Soya (70% protein)
The autolyzed yeast extracts AYE-1 = M1T - (See Example 1)
AYE-2 = NIV (See Example 7)
AYE-3 is M2T) autolyzed yeast extract powders (Saccharomyces cerevisiae) available from Stauffer Chemical Company
AYE-4 is STT)

Patties were fried the same day at 325° F. (163° C.) for 4 minutes on one side and 2 minutes on the other. These were evaluated to provide the following results:

| All pork (no soy) | bland |
|---|---|
| Soy | beany flavor |
| AYE-1 | very slight beany flavor |
| AYE-2 | fair |
| AYE-3 | good |

| | -continued | |
|---|---|---|
| AYE-4 | fair | |

EXAMPLE 10

Comminuted meat extended with soy hydrated in a solution of autolyzed yeast extract was prepared and evaluated in fine and coarse chopped meat loaves using a typical frankfurter formulation. The soy was used at a 3.5% level.

Four formulations as listed in Table VI were prepared:

TABLE VI

| Ingredients | 1 Lbs/Kg | 2 Lbs/Kg | 3 Lbs/Kg | 4 Lbs/Kg |
|---|---|---|---|---|
| Beef | 4.5/2.0 | 4.5/2.0 | 4.5/2.0 | 4.5/2.0 |
| Pork | 1.5/.675 | 1.5/.675 | 1.5/.675 | 1.5/.675 |
| Curavis 250[3] | 20 g | 20 g | 20 g | 20 g |
| Sodium Nitrite | 0.64 g | 0.64 g | 0.64 g | 0.64 g |
| Salt | 59 g | 59 g | 59 g | 59 g |
| Seasoning | 96 g | 96 g | 96 g | 96 g |
| Water | 2.7/1.22 | 2.7/1.22 | 2.7/1.22 | 2.7/1.22 |
| Soy Protein[1] | | 143 g in 358 g water | 143 g in 440 g water | 143 g in 440 g water |
| Yeast Extract[2] | None | None | 41 g | 41 g |

[1]Soy Proteinate GL 301 from Griffith Laboratories - 70% protein
[2]MIT - a yeast autolysate powder (*Saccharomyces cerevisiae*) available from Stauffer Chemical Company
[3]A mixture of sodium tripolyphosphate, sodium hexametaphate and sodium acid pyrophosphate available from Stauffer Chemical Company.

The beef, pork, Curavis 250, sodium nitrite and salt were admixed together for 4 minutes in a Hobart mixer at speed 1. The mixture was allowed to stand overnight at 38° F. (3.3° C.). The remaining ingredients were then added. In hydrating the soy, 2.5 times the soy weight of water is used. If yeast extract was present, 2 times the weight of the yeast extract of additional water was used.

In formulation 3, the yeast extract was added dry to the meat-soy mixture. In formulation 4, the yeast extract was dissolved in the water used to hydrate the soy.

An organoleptic analysis was conducted on the above formulations by an informal taste test panel of 9 members. The coarse chopped (0 seconds) and fine chopped (150 seconds) samples were tested using the following scale.

0-1 Disliked extremely
1-2 Disliked very much
2-3 Disliked moderately
3-4 Disliked slightly
4-5 Neither liked nor disliked
5-6 Liked slightly
6-7 Liked moderately
7-8 Liked very much
8-9 Liked extremely The following results were obtained:

TABLE VII

| Formulation | Coarse | Fine |
|---|---|---|
| 1 (Control) | 5.0 | 5.6 |
| 2 (Soy) | 4.8 | 3.4 |
| 3 (Soy and Dry AYE) | 6.5 | 5.6 |
| 4 (Soy and Hydrated AYE) | 5.0 | 6.8 |

Yields were obtained by cooking 14 oz. (392 gram) loaves to 160° F. (71° C.) and weighing loaves before cooking and after cooking (after pouring off purge).

TABLE VIII

| Time Seconds | Formulation - Yield % | | | |
|---|---|---|---|---|
| | 1 | 2 | 3 | 4 |
| 0 | 88.08 | 88.51 | 88.74 | 88.68 |
| 30 | 88.86 | 87.42 | 86.53 | 85.22 |
| 60 | 78.18 | 82.34 | 80.63 | 81.38 |
| 90 | 77.51 | 83.32 | 83.11 | 85.17 |
| 120 | 83.76 | 90.30 | 89.11 | 84.21 |
| 150 | 88.71 | 91.51 | 90.49 | 91.22 |

It is concluded from this data that the addition of autolyzed yeast extract and twice its weight in water gives equivalent yields in very coarse and fine chopped product. The data also shows that we can improve organoleptic acceptability while maintaining yield.

What is claimed:

1. A method for preparing a soy protein product having a reduced beany flavor which comprises hydrating said protein selected from the group consisting of soy flour, soy concentrate and soy isolate having a protein content ranging from about 40% to about 90% with a solution of primary yeast autolyzate extract until the soy protein product absorbs at least 100% of its weight of the solution in an amount sufficient to reduce the beany flavor.

2. The method as recited in claim 1 wherein the soy protein product contains at least about 65% protein.

3. The method as recited in claim 1 wherein the yeast extract is derived from *Saccharomyces cerevisiae*.

4. The method as recited in claim 1 wherein said solution contains from about 1% to about 25% yeast extract.

5. The method as recited in claim 1 wherein said solution contains from about 5% to about 15% yeast extract.

6. A hydrated soy protein-containing product having a reduced beany flavor for use in food comprising a hydrated porous soy protein-containing product selected from the group consisting of soy flour, soy concentrate and soy isolate having a protein content ranging from about 40% to about 90% intimately combined with a primary autolyzed yeast extract in an amount sufficient to reduce the beany flavor, said soy protein-containing product having been hydrated with a solution containing said primary autolyzed yeast extract until the soy protein-containing product absorbs at least 100% of its weight of the solution.

7. The product as recited in claim 6 wherein the yeast extract is derived from *Saccharomyces cerevisiae*.

8. The product as recited in claim 6 wherein the yeast extract is present in an amount ranging from about 5% to about 50% based on the combined weight of the extract and the soy protein product.

9. The product of the method of claim 1.

10. A method for preparing food products comprising blending the hydrated product of claim 6 with a food product, said product being characterized by a reduced beany flavor.

11. The method as recited in claim 10 wherein said food product is comminuted meat.

12. An extended food product comprising a food product in combination with the hydratred product of claim 6, said food product being characterized by a reduced beany flavor.

13. The product as recited in claim 12 wherein said food product is comminuted meat.

14. the method as recited in claim 10 wherein said primary yeast extract is derived from the yeast *Saccharomyces cerevisiae*.

15. The product as recited in claim 12 wherein said primary yeast extract is derived from the yeast *Saccharomyces cerevisiae*.

16. A method for preparing a soy-protein extended comminuted meat product characterized by a reduced beany flavor comprising hydrating a porous soy protein-containing product selected from the group consisting of soy flour, soy concentrate and soy isolate having a protein content ranging from about 40% to about 90% with an aqueous solution of a water-soluble primary yeast extract until said soy has absorbed at least 100% of its weight of the solution in an amount sufficient to reduce the beany flavor, grinding the hydrated soy with meat and forming the extended comminuted meat product.

17. The product of the method of claim 16.

18. The method of claim 16 wherein the said primary yeast extract is derived from the yeast *Saccharomyces cerevisiae*.

19. The method as recited in claim 11 which further includes the addition to the meat of sodium tripolyphosphate hydrated with a solution containing citrus fruit juice solids.

20. The method as recited in claim 16 which further includes the addition to the meat of sodium tripolyphosphate hydrated with a solution containing citrus fruit juice solids.

21. The method as recited in claim 1 wherein said soy protein product is hydrated just prior to use.

22. The method as recited in claim 1 wherein said soy protein product is selected from the group consisting of soy concentrate, soy isolate and mixtures thereof.

* * * * *